Dec. 4, 1956 L. V. SAUL 2,772,660
GROUND SECURED ANIMAL DRINKING RECEPTACLE
Filed Dec. 3, 1954
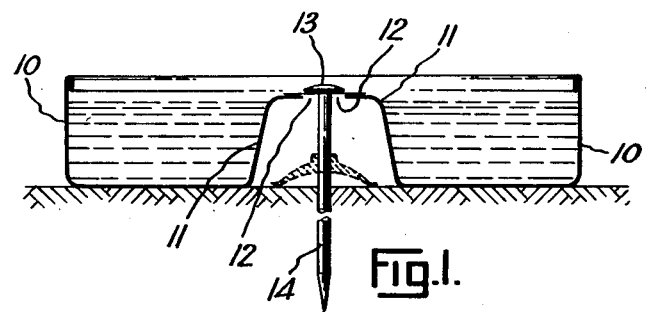
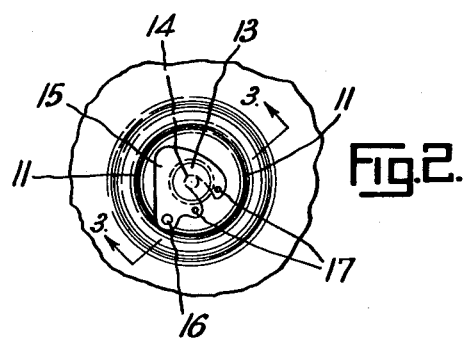
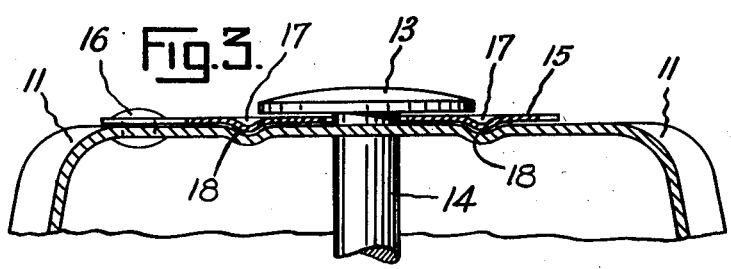
LESLIE V. SAUL
BY Mead, Browne, Schuyler & Beveridge

United States Patent Office 2,772,660
Patented Dec. 4, 1956

2,772,660

GROUND SECURED ANIMAL DRINKING RECEPTACLE

Leslie V. Saul, Elvanbrook St. George, Queensland, Australia

Application December 3, 1954, Serial No. 472,981

Claims priority, application Australia December 8, 1953

2 Claims. (Cl. 119—61)

This invention has reference to a receptacle or vessel for containing drinking water for animals more particularly dogs.

Many receptacles of that nature have been devised in the past but most of them are capable of being upset by an animal itself or by a chain to which the animal is tethered.

In country areas it is especially desirable that sheep dogs for instance which might be tethered at places remote from a homestead should have available a well filled drinking vessel which cannot be upset by the animal or its chain. Even in suburban or metropolitan areas it is desirable to have a similar device available where a dog or other pet is likely to be left unattended for relatively long periods. Accordingly, this invention has been devised to provide a drinking receptacle which can readily be anchored to the ground or secured to a floor in such a manner that it cannot be tipped over by the animal or by its chain.

The improved receptacle is characterised in that it can easily be removed from its anchoring means for cleansing purposes.

In order however that the invention may be clearly understood and readily carried into practical effect reference is now made to the accompanying drawings, wherein:

Figure 1 shows a central vertical section of the improved receptacle in one form, including an indication of alternative means for securing it in position.

Figure 2 is a detail view showing, in plan, means for locking the receptacle to its securing means.

Figure 3 is an enlarged partial vertical section of a receptacle as illustrated by Figure 1.

According to the construction illustrated by Figures 1 and 2 the receptacle is of sheet metal and its body 10 has the form of an annular trough; that is to say it has a raised central portion constituting a crown 11 within a bowl.

In the centre of the crown 11 there is a relatively large orifice 12 which is intended to allow the head 13 of an anchoring spike 14 to project therethrough. This anchoring spike 14 can be driven into the ground in the position wherein the receptacle is to be located, and when the receptacle has been placed over the embedded spike 14 a hook 15 (see Figure 2) or equivalent means is swung under the head 13 of the spike 14 so as to lock the receptacle in position. The hook 15 in the example illustrated is of sheet metal and is pivoted at 16 to the crown 11 of the receptacle. Suitable detents such as punched pips 17 may be formed on the jaws of hook 15 to engage complementary recesses 18 in the crown 11.

In some cases the hook 15 may be of spring steel and have its jaws set in opposite directions, at a slight angle to the horizontal, so that they will exert pressure against the undersurface of the head on the spike 14.

When it is desired to secure the receptacle indoors, or on a floor outside, the spike 14 may be replaced by a stud having a head such as 13 and a relatively short stem, the lower extremity of which has affixed to it a suction cup 18 (indicated in broken lines).

In either case the receptacle can be easily disengaged from the means whereby it is anchored, and removed for cleaning purposes.

While I have described an exemplary embodiment of my invention, it will be apparent to those skilled in the art that the disclosed construction is capable of modification. Therefore, the foregoing description is to be considered exemplary rather than limiting and the true scope of my invention is that defined in the following claims.

I claim:

1. An improved drinking receptacle, for dogs and other animals, comprising an annular trough with a central crown, said crown having a central aperture therein, a spike extending through said aperture, a head upon said spike adapted to pass through said aperture, said spike having a length sufficient to locate said head above said central crown when said spike is in anchoring engagement with the ground, and a flat hook pivotally mounted upon said central crown adjacent said aperture, said hook being pivotal between a first position wherein said hook is located between the head of said spike and said central crown to prevent withdrawal of said annular trough from said spike and a second position wherein said hook is located clear of the head of said spike.

2. A drinking receptacle as recited in claim 1 wherein said hook includes a downwardly projecting pip and said central crown has a complementary recess located to receive said pip when said hook is located in said first position.

References Cited in the file of this patent

UNITED STATES PATENTS

| 344,683   | Sherer        | June 29, 1886 |
| 425,385   | McKay         | Apr. 8, 1890  |
| 871,564   | Brown         | Nov. 19, 1907 |
| 1,037,093 | Wendorf et al.| Aug. 27, 1912 |
| 2,484,263 | Atkinson      | Oct. 11, 1949 |
| 2,525,890 | Gage          | Oct. 17, 1950 |
| 2,542,400 | Donofrio      | Feb. 20, 1951 |
| 2,592,638 | Andrew        | Apr. 15, 1952 |

FOREIGN PATENTS

| 185,333 | Great Britain | Sept. 7, 1922 |
| 109,533 | Australia     | Jan. 9, 1940  |